(12) United States Patent
Haridass et al.

(10) Patent No.: US 9,665,154 B2
(45) Date of Patent: May 30, 2017

(54) SUBSYSTEM-LEVEL POWER MANAGEMENT IN A MULTI-NODE VIRTUAL MACHINE ENVIRONMENT

(71) Applicant: Lenovo Enterprise Solutions (Singapore) Pte. Ltd., Singapore (SG)

(72) Inventors: Anand Haridass, Karnataka (IN); Prasanna Jayaraman, Karnataka (IN); Tony E. Sawan, Austin, TX (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 612 days.

(21) Appl. No.: 13/906,606

(22) Filed: May 31, 2013

(65) Prior Publication Data

US 2014/0359310 A1 Dec. 4, 2014

(51) Int. Cl.
*G06F 1/32* (2006.01)
*G06F 9/50* (2006.01)

(52) U.S. Cl.
CPC ............ *G06F 1/3206* (2013.01); *G06F 1/324* (2013.01); *G06F 1/3296* (2013.01); *G06F 9/5094* (2013.01); *G06F 9/5088* (2013.01); *Y02B 60/1217* (2013.01); *Y02B 60/1285* (2013.01); *Y02B 60/142* (2013.01); *Y02B 60/162* (2013.01)

(58) Field of Classification Search
CPC ............ G06F 9/50; G06F 1/26; G06F 9/4893
See application file for complete search history.

(56) References Cited

U.S. PATENT DOCUMENTS

| 6,990,593 | B2 * | 1/2006 | Nakagawa | 713/300 |
| 7,457,976 | B2 | 11/2008 | Bolan et al. | |
| 7,493,503 | B2 | 2/2009 | Aldereguia et al. | |
| 8,046,600 | B2 * | 10/2011 | Holle et al. | 713/300 |
| 8,060,760 | B2 | 11/2011 | Shetty et al. | |
| 8,082,454 | B2 | 12/2011 | Totten | |

(Continued)

OTHER PUBLICATIONS

Chen, et al., "CACM:Current-aware Capacity Management in Consolidated Server Enclosures", Second International Green Computing Conference, Work-in-Progress, Orlando, FL, Jul. 2011, 6 pages.

(Continued)

*Primary Examiner* — Zahid Choudhury
(74) *Attorney, Agent, or Firm* — Jeffrey L. Streets (57) ABSTRACT

A computer-implemented method includes capping the amount of power available to each of a plurality of compute nodes, and managing power allocation among subsystems within each of the compute nodes according to the requirements of workloads assigned to each of the compute nodes. The method further comprises reporting an actual performance level and performance capability for each subsystem within each of the plurality of compute nodes, and monitoring parametric data for a particular workload. A target compute node is identified from among the compute nodes, wherein the target compute node would be capable of performing the particular workload if power was reallocated from a first subsystem to a second subsystem within the target compute node. The particular workload is then assigned to the target compute node. Optionally, assigning the particular workload may include migrating the workload to the target compute node from another of the compute nodes.

20 Claims, 8 Drawing Sheets

(56) References Cited

U.S. PATENT DOCUMENTS

| | | | |
|---|---|---|---|
| 8,341,441 B2* | 12/2012 | Fletcher | G06F 1/3203 713/300 |
| 2003/0188208 A1 | 10/2003 | Fung | |
| 2008/0178029 A1* | 7/2008 | McGrane | G06F 1/3287 713/324 |
| 2008/0301475 A1* | 12/2008 | Felter et al. | 713/300 |
| 2009/0113221 A1* | 4/2009 | Holle | G06F 1/189 713/310 |
| 2010/0037077 A1* | 2/2010 | Kashyap | 713/330 |
| 2010/0186019 A1* | 7/2010 | Branson et al. | 718/104 |
| 2010/0228861 A1* | 9/2010 | Arsovski | G06F 9/5027 709/226 |
| 2012/0076003 A1 | 3/2012 | Wong | |
| 2012/0137158 A1 | 5/2012 | Nelluri et al. | |
| 2012/0137289 A1 | 5/2012 | Nolterieke et al. | |
| 2012/0226922 A1* | 9/2012 | Wang et al. | 713/320 |
| 2013/0332753 A1* | 12/2013 | Varma | G06F 1/26 713/300 |

OTHER PUBLICATIONS

IP.com "Method and system of automatic and intelligent power allocation in chassis", Method and system of automatic and intelligent power allocation in chassis . . . http://ip.com/IPCOM/000188706, Oct. 20, 2009, 1 page.

* cited by examiner

SUBSYSTEM-LEVEL POWER MANAGEMENT IN A MULTI-NODE VIRTUAL MACHINE ENVIRONMENT

BACKGROUND

Field of the Invention

The present invention relates to power management in a multi-node virtual machine environment.

Background of the Related Art

In a cloud computing environment, a user is assigned a virtual machine somewhere in the computing cloud. The virtual machine provides the software operating system and has access to physical resources, such as input/output bandwidth, processing power and memory capacity, to support the user's application. Provisioning software manages and allocates virtual machines among the available computer nodes in the cloud. Because each virtual machine runs independent of other virtual machines, multiple operating system environments can co-exist on the same computer in complete isolation from each other.

BRIEF SUMMARY

One embodiment of the present invention provides a computer-implemented method, comprising capping the amount of power available to each of a plurality of compute nodes, and managing power allocation among subsystems within each of the plurality of compute nodes according to the requirements of workloads assigned to each of the plurality of compute nodes. The method further comprises reporting an actual performance level and performance capability for each of the subsystems within each of the plurality of compute nodes, and monitoring parametric data for a particular workload. A target compute node is identified from among the plurality of compute nodes, wherein the target compute node would be capable of performing the particular workload if power was reallocated from a first subsystem to a second subsystem within the target compute node. The method may then assign the particular workload to the target compute node.

DETAILED DESCRIPTION

One embodiment of the present invention provides a computer-implemented method, comprising capping the amount of power available to each of a plurality of compute nodes, and managing power allocation among subsystems within each of the plurality of compute nodes according to the requirements of workloads assigned to each of the plurality of compute nodes. The method further comprises reporting an actual performance level and performance capability for each of the subsystems within each of the plurality of compute nodes, and monitoring parametric data for a particular workload. A target compute node is identified from among the plurality of compute nodes, wherein the target compute node would be capable of performing the particular workload if power was reallocated from a first subsystem to a second subsystem within the target compute node. The method may then assign the particular workload to the target compute node. Optionally, assigning the particular workload to the target compute node may include migrating the workload to the target compute node from another of the plurality of compute nodes.

The amount of power available to each of a plurality of compute nodes is capped, for example, at a fixed amount of power subject to periodic increases or decreases. In a multi-node environment, such as a multi-server blade chassis, a chassis management module may be responsible for determining an appropriate amount of power for each compute node or other information technology equipment (ITE) and instructing the individual compute nodes to cap their power consumption at the amount of the "power cap." The chassis management module may determine a "power cap" for each compute node in consideration of various factors, including a cumulative power cap amount for all of the compute nodes in the chassis. A chassis management module may be instructed to limit power consumption to a chassis power cap by a remote management node.

Power allocation among subsystems within each of the plurality of compute nodes is managed according to the requirements of workloads assigned to each of the plurality of compute nodes. For example, each compute node will have a management controller, such as a baseboard management controller (BMC), which is capable of monitoring and controlling various operating characteristics of subsystems within the compute node. In accordance with specific embodiments of the invention, a management controller may control the power consumption or operating mode of multiple subsystems. The subsystems preferably include at least a processor and memory, but may further include input/output adapters, power delivery components, and cooling devices. The management controller may allocate power among the subsystems in a manner that allows the subsystems to perform the workloads while limiting the total power consumption to the power cap assigned to the compute node. For example, if the compute node is assigned to run a workload that is processor intensive, then the management controller may, if needed, allocate unallocated power under the compute node's power cap to the processor. Furthermore, managing power allocation among subsystems within each of the plurality of compute nodes may include reallocating power from the first subsystem to the second subsystem within the target compute node. For example, the management controller may reduce an amount of power allocated to the memory so that an equal amount of power may instead be allocated to the processor. In another example, the subsystems of each of the plurality of compute nodes include a processor and a memory module, wherein managing power allocation among the subsystems within each of the plurality of compute nodes includes controlling the voltage and frequency of the processor and controlling the throughput of the memory module.

As stated above, the method further comprises reporting an actual performance level and performance capability for each of the subsystems within each of the plurality of compute nodes. Such information may be reported to, and collected by, a chassis management module. Furthermore, parametric data for a particular workload may be monitored by the chassis management module, whether the workload is currently running on a compute node or is a new workload yet to be run. A target compute node may be identified from among the plurality of compute nodes, wherein the target compute node would be capable of performing the particular workload if power was reallocated from a first subsystem to a second subsystem within the target compute node. For example, a chassis management module may, in view of the capability of a management module for a compute node to reallocate power among its subsystems, consider assigning a workload to a target compute node that can perform the particular workload even if the present allocation of power among subsystems in the target compute node would not be sufficient to perform the particular workload. Once the particular workload has been assigned to the target compute node, the target compute node may reallocate power to its subsystems in a manner that facilitates the performance of the particular workload. Accordingly, power may be reallocated from a first subsystem to a second subsystem within the target compute node in response to the workload placing a demand on the second subsystem that requires more power than a previous power allocation to the second subsystem. Optionally, the power may be reallocated from the first subsystem to the second subsystem without allocating any additional power to the target compute node.

In a further embodiment, the target compute node may request an increase in its capped amount of power in response to the target compute node reallocating power among subsystems to reduce stranded power within the target compute node and running workloads that have a collective power requirement exceeding the power cap after having reallocated power among the subsystems. In other words, after a management controller of a compute node has already reallocated power among its subsystems so that the compute node is making the best use of its power cap, the management controller may send a request for an increase in its power cap to the chassis management module if additional power is needed to meet the power requirements of the workloads assigned to the compute node. However, the management controller preferably will not request, and the chassis management module preferably will not grant, an increase in the compute node power cap if the relevant subsystem did not have additional unused capabilities that could make use of the power.

In another embodiment, the method caps the collective amount of power available to the plurality of compute nodes. As mentioned above, such a power cap may be implemented by a remote management node. If the plurality compute nodes have collective workload demands that exceed the power cap of the plurality of compute nodes (i.e., a chassis power cap), then one or more high priority compute nodes among the plurality of compute nodes may be given a high priority. Accordingly, the method may include increasing the capped amount of power available to the one or more high priority compute nodes in response to the one or more high priority compute nodes requesting more power, and reducing the capped amount of power available to lower priority compute nodes among the plurality of compute nodes in order to keep the total power consumption for the plurality of compute nodes within the capped collective amount of power.

In yet another embodiment, the method may reduce the capped amount of power available to a subset of the plurality of compute nodes in response to a partial loss of power. A chassis power supply, or multiple chassis power supplies, distributes power to each of the compute nodes in the chassis. When a power supply fails, there is less power available. However, the present embodiment would not reduce power to all compute nodes, but rather reduces the capped amount of power available to a subset of the compute nodes. For example, a high priority compute node that is running one or more high priority workloads may be allowed to continue operating without any reduction in its power cap.

In a still further embodiment, each of the plurality of compute nodes report power allocation data to a chassis management module, wherein the power allocation data for each compute node includes the amount of power allocated to each subsystem and the amount of power being used by each subsystem, such as a processor and a memory module. The chassis management module will preferably maintain access to data identifying the performance capability of each subsystem in each of the plurality of compute nodes. The data reported allows the chassis management to determine which of the compute nodes is best suited to run a workload. For example, a workload having a high priority may be assigned to a compute node that is operating in performance mode.

In another embodiment, a profile may be maintained for each workload that is being run by the plurality of compute nodes, wherein each profile characterizes the resource requirements of a workload. Optionally, the method may include monitoring the resource requirements of a new workload that is being run by a compute node, and maintaining a profile characterizing the resource requirements of the new workload.

In yet another embodiment, each of the compute nodes may be ranked as a function of performance capabilities of the subsystems in each compute node. Then, the ranking of compute nodes may be used to identify one or more of the plurality of compute nodes that is capable of running a particular workload based on the profile maintained for the particular workload.

In an additional embodiment, the capped amount of power available to the target compute node may be maintained or increased in response to a partial loss of power to the plurality of compute nodes, wherein assigning the particular workload to the target compute node includes migrating the workload to the target compute node from a compute node among the subset of compute nodes in response to a partial loss of power.

A further embodiment responds to a partial loss of power or a loss of communication between a chassis management control and the target compute node, by allowing the target compute node to continue operating with the capped amount of power and reducing the capped amount of power to the other compute nodes in the plurality of compute nodes.

It should be understood that although this disclosure is applicable to cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
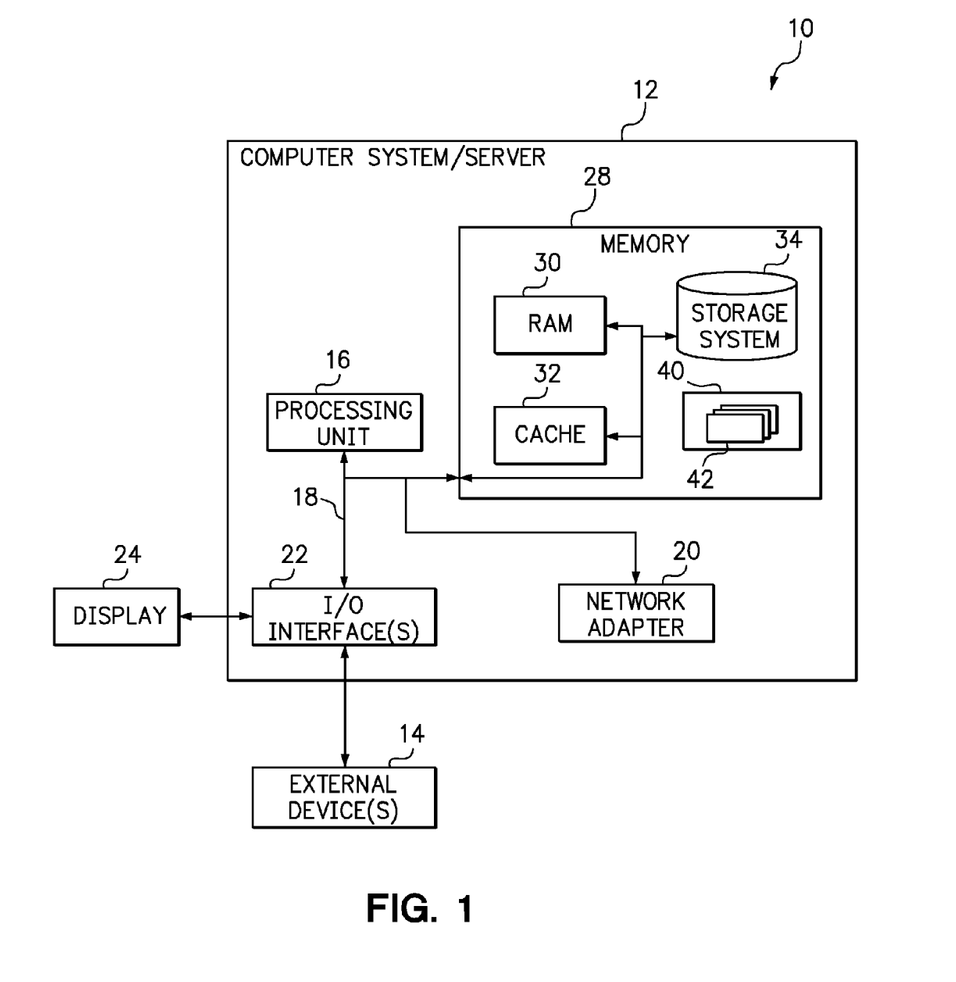
FIG. 1 is a diagram of an exemplary computer that may be utilized by the presently disclosed method, system, and/or computer program product.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
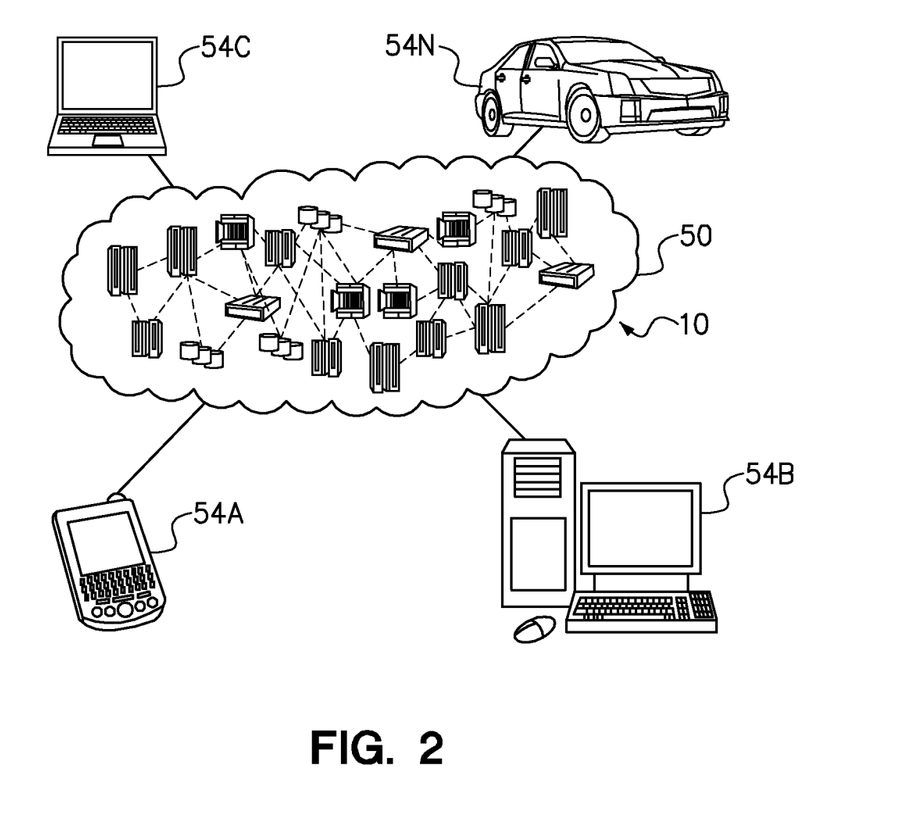
FIG. 2 illustrates an exemplary blade chassis that may be utilized by the presently disclosed method, system, and/or computer program product.

Referring now to FIG. 2, an illustrative cloud computing environment 50 is depicted. As shown, the cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
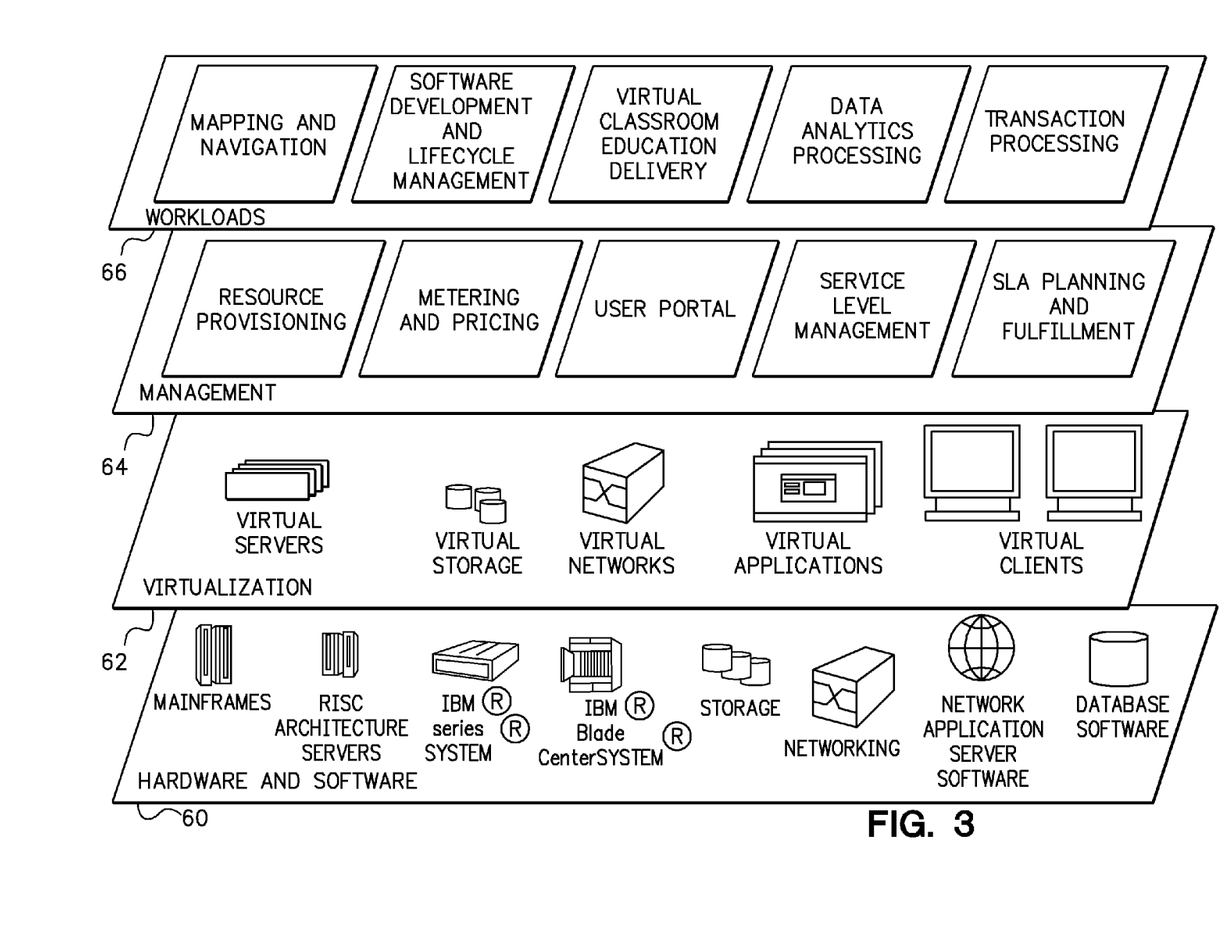
FIG. 3 depicts another embodiment of the present disclosed method utilizing multiple physical computers in a virtualized rack.

Referring now to FIG. 3, a set of functional abstraction layers provided by cloud computing environment 50 (Shown in FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

Figure 4:
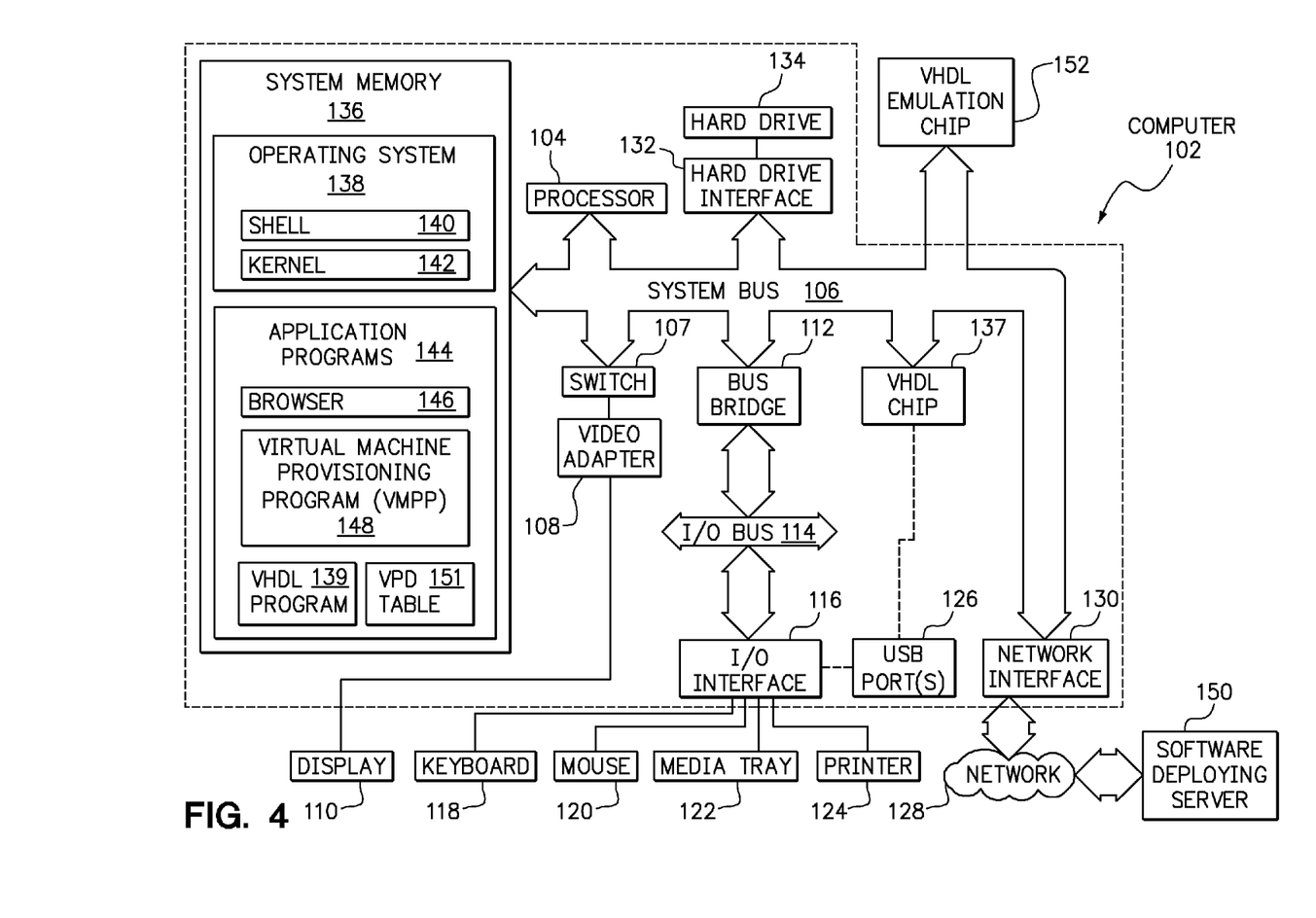
FIG. 4 is a diagram illustrating certain data maintained by a director server or a management node including a provisioning manager.

FIG. 4 depicts an exemplary computing node (or simply "computer") 102 that may be utilized in accordance with one or more embodiments of the present invention. Note that some or all of the exemplary architecture, including both depicted hardware and software, shown for and within computer 102 may be utilized by the software deploying server 150, as well as the provisioning manager/management node 222 and the server blades 204a-n shown in FIG. 5. Note that while the server blades described in the present disclosure are described and depicted in exemplary manner as server blades in a blade chassis, some or all of the computers described herein may be stand-alone computers, servers, or other integrated or stand-alone computing devices. Thus, the terms "blade," "server blade," "computer," and "server" are used interchangeably in the present descriptions.

Computer 102 includes a processor unit 104 that is coupled to a system bus 106. Processor unit 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional only upon execution of instructions (e.g., virtual machine provisioning program—VMPP 148 described below) that support the processes described herein.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below), external USB port(s) 126. While the format of the ports connected to I/O interface 116 may be any known to those skilled in the art of computer architecture, in a preferred embodiment some or all of these ports are universal serial bus (USB) ports.

As depicted, computer 102 is able to communicate with a software deploying server 150 via network 128 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

The operating system 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Application programs 144 in the system memory of computer 102 (as well as the system memory of the software deploying server 150) also include a virtual machine provisioning program (VMPP) 148. VMPP 148 may include code for implementing the processes described below, such as those described in reference to FIGS. 6-9. VMPP 148 is able to communicate with a vital product data (VPD) table 151, which provides required VPD data described below. In one embodiment, the computer 102 is able to download VMPP 148 from software deploying server 150, including in an on-demand basis. Note further that, in one embodiment of the present invention, software deploying server 150 performs all of the functions associated with the present invention (including execution of VMPP 148), thus freeing computer 102 from having to use its own internal computing resources to execute VMPP 148.

Also stored in the system memory 136 is a VHDL (VHSIC hardware description language) program 139. VHDL is an exemplary design-entry language for field programmable gate arrays (FPGAs), application specific integrated circuits (ASICs), and other similar electronic devices. In one embodiment, execution of instructions from VMPP 148 causes the VHDL program 139 to configure the VHDL chip 137, which may be an FPGA, ASIC, or the like.

In another embodiment of the present invention, execution of instructions from VMPP 148 results in a utilization of VHDL program 139 to program a VHDL emulation chip 151. VHDL emulation chip 151 may incorporate a similar architecture as described above for VHDL chip 137. Once VMPP 148 and VHDL program 139 program VHDL emulation chip 151, VHDL emulation chip 151 performs, as hardware, some or all functions described by one or more executions of some or all of the instructions found in VMPP 148. That is, the VHDL emulation chip 151 is a hardware emulation of some or all of the software instructions found in VMPP 148. In one embodiment, VHDL emulation chip 151 is a programmable read only memory (PROM) that, once burned in accordance with instructions from VMPP 148 and VHDL program 139, is permanently transformed into a new circuitry that performs the functions needed to perform the processes of the present invention.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

A cloud computing environment allows a user workload to be assigned a virtual machine (VM) somewhere in the computing cloud. This virtual machine provides the software operating system and physical resources such as processing power and memory to support the user's application workload.

Figure 5:
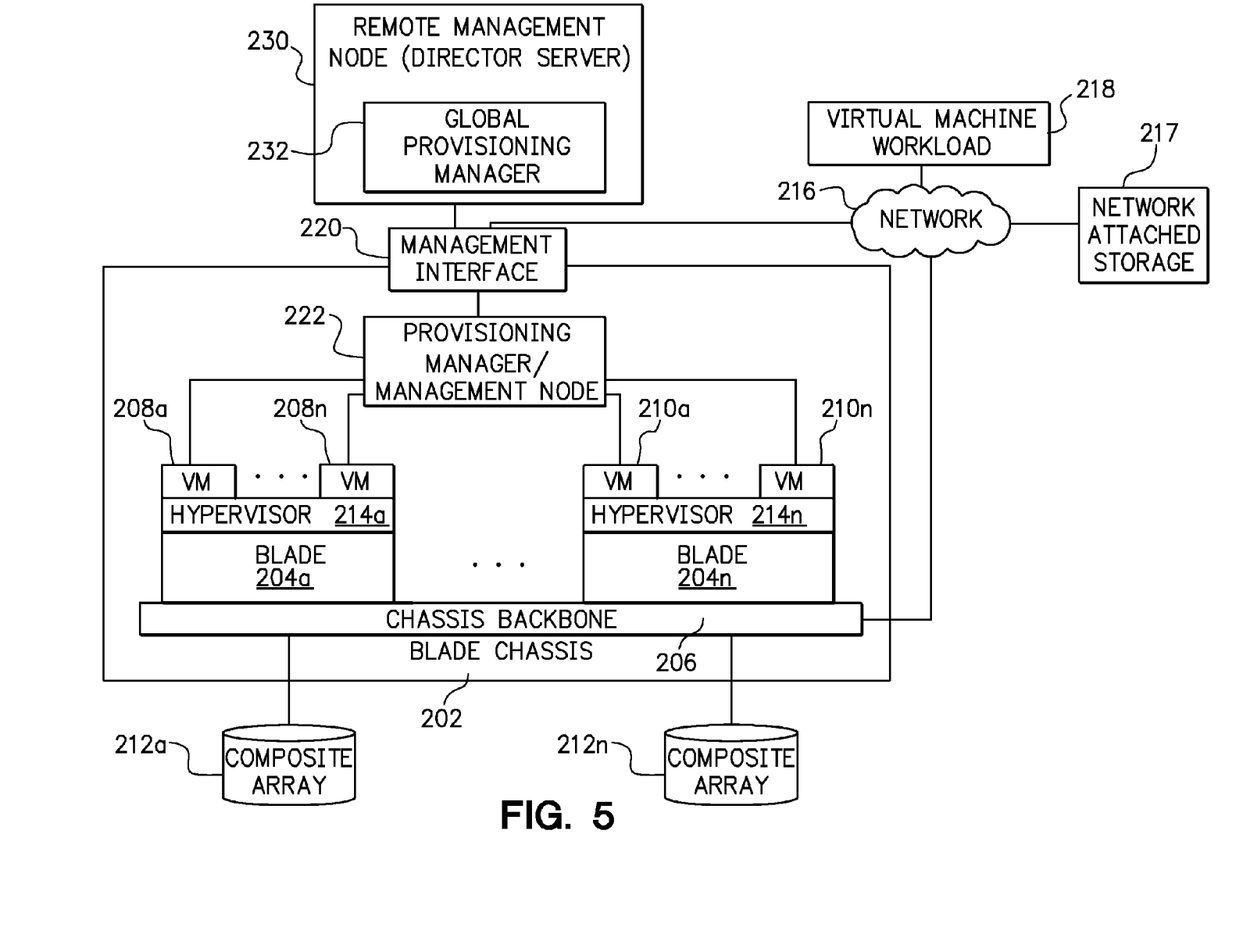
FIG. 5 is a diagram of virtual machines running on two compute nodes.

FIG. 5 depicts an exemplary blade chassis that may be utilized in accordance with one or more embodiments of the present invention. The exemplary blade chassis 202 may operate in a "cloud" environment to provide a pool of resources. Blade chassis 202 comprises a plurality of blades 204a-n (where "a-n" indicates an integer number of blades) coupled to a chassis backbone 206. Each blade supports one or more virtual machines (VMs). As known to those skilled in the art of computers, a VM is a software implementation (emulation) of a physical computer. A single hardware computer (blade) can support multiple VMs, each running the same, different, or shared operating systems. In one embodiment, each VM can be specifically tailored and reserved for executing software tasks 1) of a particular type (e.g., database management, graphics, word processing etc.); 2) for a particular user, subscriber, client, group or other entity; 3) at a particular time of day or day of week (e.g., at a permitted time of day or schedule); etc.

As depicted in FIG. 5, blade 204a supports VMs 208a-n (where "a-n" indicates an integer number of VMs), and blade 204n supports VMs 210a-n (wherein "a-n" indicates an integer number of VMs). Blades 204a-n are coupled to a storage device 212 that provides a hypervisor 214, guest operating systems, and applications for users (not shown). Provisioning software from the storage device 212 allocates boot storage within the storage device 212 to contain the maximum number of guest operating systems, and associates applications based on the total amount of storage (such as that found within storage device 212) within the cloud. For example, support of one guest operating system and its associated applications may require 1 GByte of physical memory storage within storage device 212 to store the application, and another 1 GByte of memory space within storage device 212 to execute that application. If the total amount of memory storage within a physical server, such as boot storage device 212, is 64 GB, the provisioning software assumes that the physical server can support 32 virtual machines. This application can be located remotely in the network 216 and transmitted from the network attached storage 217 to the storage device 212 over the network. The global provisioning manager 232 running on the remote management node (Director Server) 230 performs this task. In this embodiment, the computer hardware characteristics are communicated from the VPD 151 to the VMPP 148. The VMPP 148 communicates the computer physical characteristics to the blade chassis provisioning manager 222, to the management interface 220, and to the global provisioning manager 232 running on the remote management node (Director Server) 230.

Note that chassis backbone 206 is also coupled to a network 216, which may be a public network (e.g., the Internet), a private network (e.g., a virtual private network or an actual internal hardware network), etc. Network 216 permits a virtual machine workload 218 to be communicated to a management interface 220 of the blade chassis 202. This virtual machine workload 218 is a software task whose execution, on any of the VMs within the blade chassis 202, is to request and coordinate deployment of workload resources with the management interface 220. The management interface 220 then transmits this workload request to a provisioning manager/management node 222, which is hardware and/or software logic capable of configuring VMs within the blade chassis 202 to execute the requested software task. In essence the virtual machine workload 218 manages the overall provisioning of VMs by communicating with the blade chassis management interface 220 and provisioning management node 222. Then this request is further communicated to the VMPP 148 in the computer system. Note that the blade chassis 202 is an exemplary computer environment in which the presently disclosed methods can operate. The scope of the presently disclosed system should not be limited to a blade chassis, however. That is, the presently disclosed methods can also be used in any computer environment that utilizes some type of workload management or resource provisioning, as described herein. Thus, the terms "blade chassis," "computer chassis," and "computer environment" are used interchangeably to describe a computer system that manages multiple computers/blades/servers.

Figure 6:
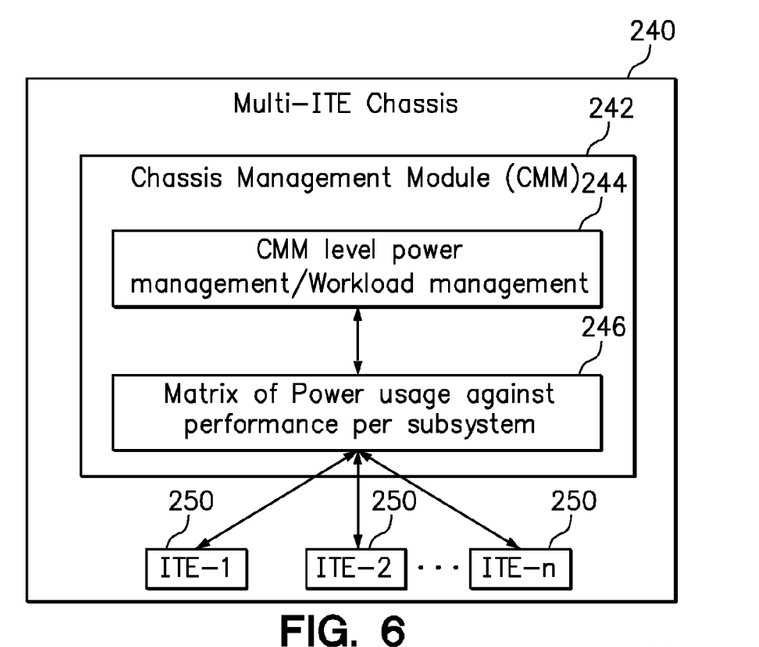
FIG. 6 is a diagram of a multi-node chassis in accordance with one embodiment.

FIG. 6 is a diagram of a multi-node chassis 240 in accordance with one embodiment. The multi-node chassis 240 includes a chassis management module 242 and a plurality of compute nodes or ITEs 250 (ITE-1 through ITE-n). In accordance with various embodiments of the invention, the chassis management module (CMM) 242 includes control logic 244 for executing CMM level power management and workload management and control logic 246 for maintaining a matrix of power usage against performance for each subsystem of each compute node in the chassis 240.

Figure 7:
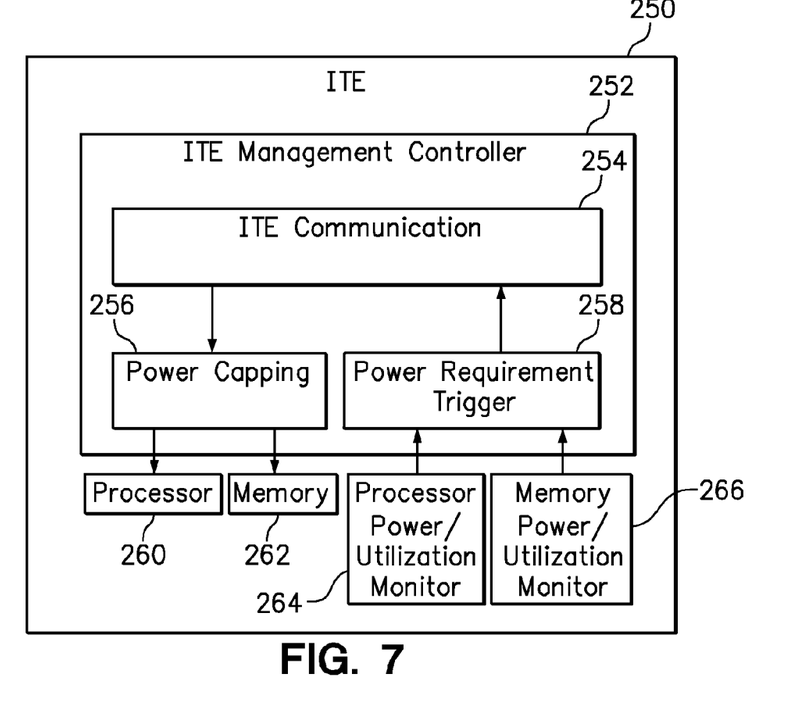
FIG. 7 is a diagram of a compute node in accordance with one embodiment.

FIG. 7 is a diagram of a compute node or ITE 250 in accordance with one embodiment. The compute node 250 includes a management controller 252 with control logic 254 for handling ITE communication to and from the ITE, such as communication with the chassis management module 244 (See FIG. 6). Outgoing communications may include, without limitation, power capping 256 to a processor 260 and memory 262. Incoming communications may include, without limitation, power requirement triggers 258 from a processor power/utilization monitor 264 and a memory power/utilization monitor 266.

Figure 8:
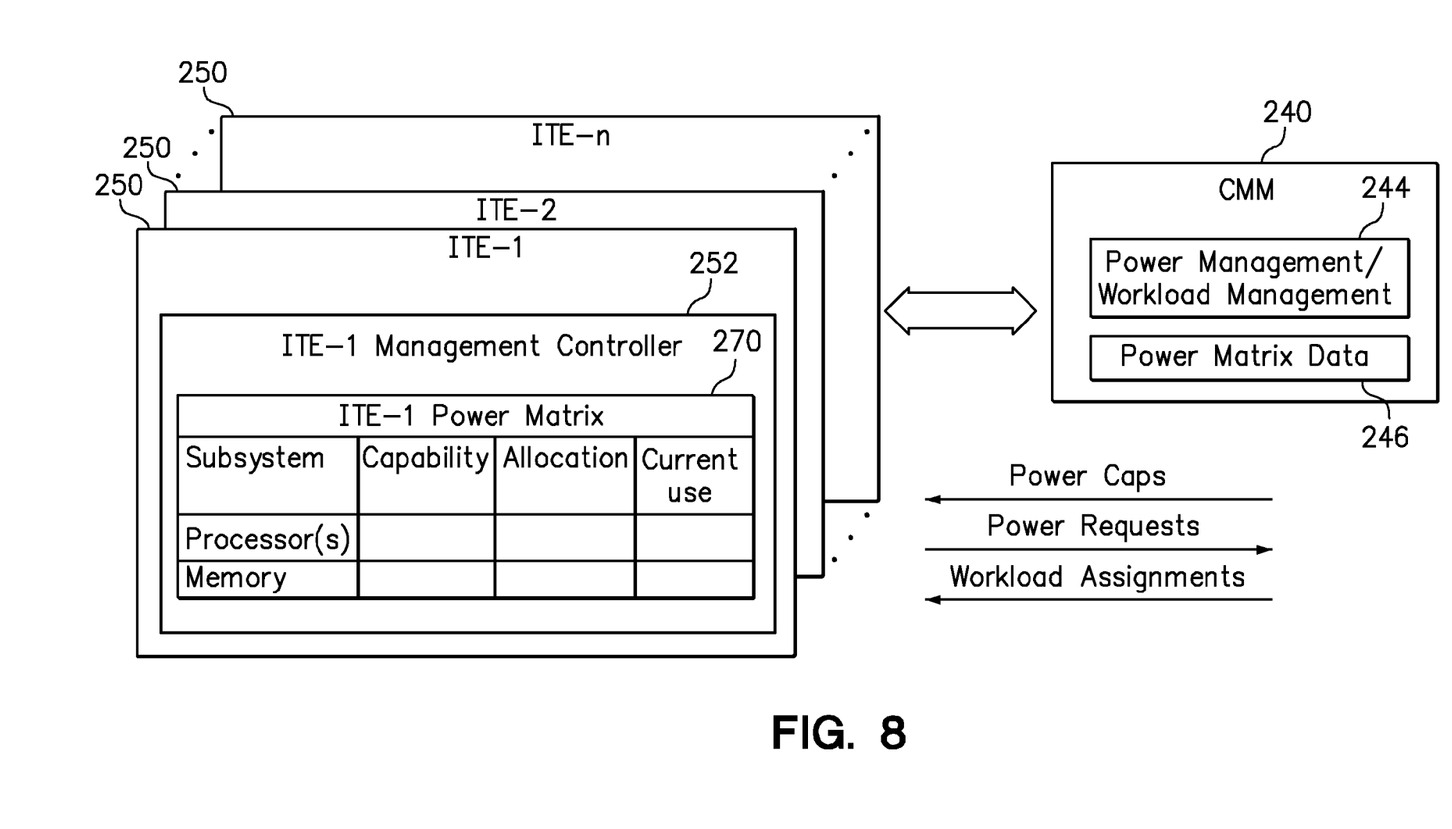
FIG. 8 is a diagram of a chassis management module in communication with a group of compute nodes capable of controlling subsystem power allocation.

FIG. 8 is a diagram of the chassis management module 240 in communication with a group of compute nodes 250 that are each capable of controlling subsystem power allocation. Each compute node 250 has a management controller 252 that maintains a power matrix 270. The power matrix 270 for a given compute node 250 identifies each subsystem, as well as the power capability (max power), allocation (subsystem power cap), and current use (power consumption) for each subsystem. As shown, the power matrix 270 includes only a processor subsystem and a memory subsystem (consistent with FIG. 7), but other subsystems may be included, so long as the compute node has the capability of power capping that subsystem and monitoring power consumption of that subsystem.

The chassis management module 240 includes a power management and workload management module 244 for handling virtual machines on the compute nodes 250, and power matrix data 246 that represents the collection of data from the power matrices of all of the compute nodes 250. The power matrix data 246 is used on the power management and workload management module 244 in its issuance of power caps to individual compute nodes, handling of power requests receiving from individual compute nodes (increases/decreases of power caps), and workload assignments to individual compute nodes. These aspects and functions may be performed consistent with any of the embodiments of the invention described herein.

Figure 9:
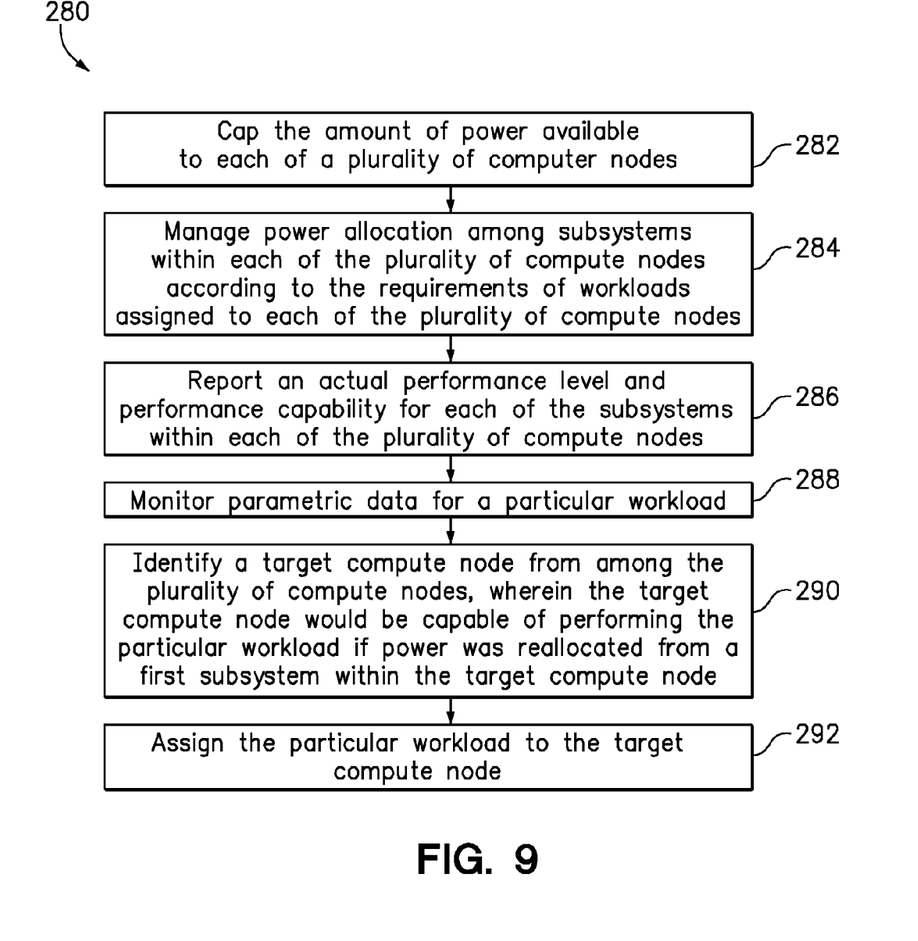
FIG. 9 is a flowchart of a method in accordance with an embodiment of the present invention.

FIG. 9 is a flowchart of a method 280 in accordance with an embodiment of the present invention. Step 282 caps the amount of power available to each of a plurality of compute nodes. In step 284, power allocation among subsystems within each of the plurality of compute nodes is managed according to the requirements of workloads assigned to each of the plurality of compute nodes. An actual performance level and performance capability for each of the subsystems within each of the plurality of compute nodes is reported in step 286. Step 288 monitors parametric data for a particular workload.

A target compute node from among the plurality of compute nodes is identified in step 290, wherein the target compute node would be capable of performing the particular workload if power was reallocated from a first subsystem to a second subsystem within the target compute node. Then, in step 292 the particular workload is assigned to the target compute node.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method, comprising:
   capping the amount of power available to each of a plurality of compute nodes;
   managing power allocation among subsystems within each of the plurality of compute nodes according to the requirements of workloads assigned to each of the plurality of compute nodes;
   reporting an actual performance level and performance capability for each of the subsystems within each of the plurality of compute nodes;
   monitoring parametric data for a particular workload;
   identifying a target compute node from among the plurality of compute nodes, wherein the target compute node would be capable of performing the particular workload if power was reallocated from a first subsystem to a second subsystem within the target compute node; and
   assigning the particular workload to the target compute node in response to identifying the target compute node.

2. The computer-implemented method of claim 1, wherein managing power allocation among subsystems within each of the plurality of compute nodes includes reallocating power from the first subsystem to the second subsystem within the target compute node.

3. The computer-implemented method of claim 2, wherein power is reallocated from the first subsystem to the second subsystem within the target compute node in response to the workload placing a demand on the second subsystem that requires more power than a previous power allocation to the second subsystem.

4. The computer-implemented method of claim 3, wherein the power is reallocated from the first subsystem to the second subsystem without allocating any additional power to the target compute node.

5. The computer-implemented method of claim 3, further comprising:
   the target compute node requesting an increase in its capped amount of power in response to the target compute node reallocating power among subsystems to reduce stranded power within the target compute node and running workloads that have a collective power requirement exceeding the power cap after having reallocated power among the subsystems.

6. The computer-implemented method of claim 1, further comprising:
   capping the collective amount of power available to the plurality of compute nodes;
   giving higher priority to one or more high priority compute nodes among the plurality of compute nodes;
   increasing the capped amount of power available to the one or more high priority compute nodes in response to the one or more high priority compute nodes requesting more power; and
   reducing the capped amount of power available to lower priority compute nodes among the plurality of compute nodes in order to keep the total power consumption for the plurality of compute nodes within the capped collective amount of power.

7. The computer-implemented method of claim 1, further comprising:
   reducing the capped amount of power available to a subset of the plurality of compute nodes in response to a partial loss of power.

8. The computer-implemented method of claim 1, further comprising:
   each of the plurality of compute nodes reporting power allocation data to a chassis management module, wherein the power allocation data for each compute node includes the amount of power allocated to each subsystem and the amount of power being used by each subsystem.

9. The computer-implemented method of claim 8, wherein the subsystems include a processor and a memory module.

10. The computer-implemented method of claim 8, further comprising:
    the chassis management module maintaining access to data identifying the performance capability of each subsystem in each of the plurality of compute nodes.

11. The computer-implemented method of claim 1, further comprising:

maintaining a profile for each workload that is being run by the plurality of compute nodes, wherein each profile characterizes the resource requirements of a workload.

12. The computer-implemented method of claim 11, further comprising:
monitoring the resource requirements of a new workload that is being run by a compute node, and maintaining a profile characterizing the resource requirements of the new workload.

13. The computer-implemented method of claim 11, further comprising:
ranking each of the compute nodes as a function of performance capabilities of the subsystems in each compute node.

14. The computer-implemented method of claim 13, further comprising:
using the ranking of compute nodes to identify one or more of the plurality of compute nodes that is capable of running a particular workload based on the profile maintained for the particular workload.

15. The computer-implemented method of claim 1, wherein the subsystems of each of the plurality of compute nodes includes a processor and a memory module, and wherein managing power allocation among the subsystems within each of the plurality of compute nodes includes controlling the voltage and frequency of the processor and controlling the throughput of the memory module.

16. The computer-implemented method of claim 1, wherein assigning the particular workload to the target compute node includes migrating the workload to the target compute node from another of the plurality of compute nodes.

17. The computer-implemented method of claim 7, further comprising:
maintaining or increasing the capped amount of power available to the target compute node in response to a partial loss of power to the plurality of compute nodes, wherein assigning the particular workload to the target compute node includes migrating the workload to the target compute node from a compute node among the subset of compute nodes in response to a partial loss of power.

18. The computer-implemented method of claim 8, wherein the subsystems include two more subsystem selected from processors, memory modules, input/output adapters, and cooling systems.

19. The computer-implemented method of claim 1, wherein a workload having a high priority is assigned to a compute node that is operating in performance mode.

20. The computer-implemented method of claim 1, further comprising:
in response to a partial loss of power and a loss of communication between a chassis management control and the target compute node, allowing the target compute node to continue operating with the capped amount of power and reducing the capped amount of power to the other compute nodes in the plurality of compute nodes.

* * * * *